(12) United States Patent
Falk (10) Patent No.: US 8,257,182 B2
(45) Date of Patent: Sep. 4, 2012

(54) TORQUE TRANSMITTING SHAFT (75) Inventor: Curt Falk, Hudiksvall (SE)

(73) Assignee: Voith Turbo Safeset AB, Hudiksvall (SE)

( * ) Notice: Subject to any disclaimer, the term of this patent is extended or adjusted under 35 U.S.C. 154(b) by 110 days.

(21) Appl. No.: 12/745,511

(22) PCT Filed: Oct. 2, 2008

(86) PCT No.: PCT/SE2008/051119
§ 371 (c)(1),
(2), (4) Date: May 28, 2010

(87) PCT Pub. No.: WO2009/070095
PCT Pub. Date: Jun. 4, 2009

(65) Prior Publication Data
US 2010/0273562 A1 Oct. 28, 2010

(30) Foreign Application Priority Data
Nov. 29, 2007 (SE) .................................. 0702642

(51) Int. Cl.
F16C 3/02 (2006.01)
F16D 7/00 (2006.01)

(52) U.S. Cl. .......................................... 464/37; 464/182

(58) Field of Classification Search ............. 464/24, 464/30, 37, 162, 179, 182; 403/31; 192/56.3, 192/75, 79, 85.12, 85.13, 85.61, 107 M, 107 T, 192/113.36; 188/367
See application file for complete search history.

(56) References Cited

FOREIGN PATENT DOCUMENTS

| DE | 86 12 620 | 8/1986 |
|---|---|---|
| DE | 35 45 651 | 7/1987 |
| DE | 195 29 980 | 3/1997 |
| DE | 19529980 | * 3/1997 |
| FR | 2 849 479 | 7/2004 |
| WO | 2005/061916 | 7/2005 |

OTHER PUBLICATIONS

International Search Report mailed Feb. 20, 2009 cited in International Application No. PCT/SE2008/051119.

* cited by examiner

Primary Examiner — Gregory Binda
Assistant Examiner — Josh Skroupa
(74) Attorney, Agent, or Firm — Drinker Biddle & Reath LLP (57) ABSTRACT A torque transmitting cardan shaft including within the shaft an adapted intermediate member or shaft, which has a first end section, that is intended for a rotationally rigid co-action with a first universal joint yoke and a second end section, opposite the first end section, intended for a rotationally rigid co-action with a second universal joint yoke. The intermediate member or shaft and its end section is configured as and comprises two parts or subsections, which are mutually joined via a safety coupling arrangement, by means of which a free coupling of the subsections from one other can be ensured immediately after the torque, between the subsections, exceeds a predetermined value, determined by the construction of the safety coupling arrangement. An end section and its universal joint yoke includes an axially orientated cylindrical groove or recess, which has a center axis that is co-ordinated with or aligned with a rotational axis of the first end section and its co-ordinated universal joint yoke. The circular groove or recess is dimensioned to enable the enclosure of a major cylindrical part of the safety coupling arrangement and its safety unit first part and co-operate with a second part formed as a disc. The end section or extension and its yoke are integrally formed in one single piece.

24 Claims, 3 Drawing Sheets

TORQUE TRANSMITTING SHAFT

FIELD OF INVENTION

The present invention relates generally to a rotatable shaft, and in the sense of a torque transmitting or transferring shaft.

The present invention has its application in such rotatable shafts and/or torque transmitting shafts that are formed as a cardan shaft, with related one or two universal joint arrangements.

The present invention is primarily based upon a new design of a universal joint related yoke and an adjacent short section of an end extension of said shaft.

Said section is formed to co-operate with and to partly include a safety coupling arrangement.

A universal joint or a universal coupling is a coupling capable of transmitting a rotation movement form one shaft to another, not arranged collinear with each other.

Such a universal joint is typically consisting of a cross-shaped piece, having pivots on its four arms so arranged that one pair of pivots are engaged with the eyes of a first yoke at the end of a first shaft and that another pair of pivots are engaged with the eyes of a second yoke at the end of a second shaft.

A cardan shaft has one or usually two end-related universal joint yokes and a load or torque transmitting "intermediate" member or shaft, disposed between said two universal joint yokes, for the transmission of an adapted torque.

More particularly, the present invention may obtain an application adjacent to said "intermediate" member, which is configured or arranged with a first end section, related to a first universal joint yoke, for a rotationally rigid (not sliding) co-action with a first additional universal joint yoke, and a second end section, oriented opposite to said first end section, related to a second universal joint yoke, for a rotationally rigid (not sliding) co-action, with a second additional universal joint yoke.

Said first universal joint yoke and said second universal joint yoke, related to said "intermediate" member, are each in cooperation with an additional universal joint yoke, via its cross-shaped piece as a universal joint pin, and thus forming a universal joint arrangement. These additional universal joint yokes do not form part of the present invention and is therefore not described in detail in the following description.

Said "intermediate" member being thus formed as a subsection of a shaft for a rotationally rigid co-action with said first and second universal joint yokes, for transmitting said torque.

However a rotatable shaft or axle, having only one universal joint yoke, has however also a shaft section, which functionally is to be compared with said "intermediate" member, as said shaft section is, in its second end section thereof, in cooperation with other torque transition or transmitting means than said second universal joint yoke.

The "intermediate" member has been formed with, and includes, at least two so called "real" or "fictive" subsections, which are mutually joined or related together via a safety coupling arrangement.

In the case of such "real" subsections, such as a safety coupling arrangement, they are intended to enable an engaged setting or position, a first position, or a free-coupling setting or position, a second position, and in said second position these subsections are separated from one another, either by purpose or more automatically, as the torque transition between these "real" subsections exceeds a pre-determined value, where said value is determined by the mechanical construction of and the orientation of the safety coupling arrangement used.

In the case of "fictive" subsections, and making use of an alternative safety coupling arrangement, these subsections are arranged to be formed between said fictively formed subsections, this safety coupling arrangement may be in the form of a simple reduction of the diameter in the intermediate member to a value, at which the intermediate member will be separated or broken to two separate subsections by the shearing forces concentrated to said reduced diameter section of the member, when the transmitted torque exceeds a pre-determined value.

When the subsections thus are separated the safety coupling arrangement must be replaced with a new "intermediate" member.

Such a construction suffers from the drawback that a diameter reduced section is subjected to different and alternating torque stresses and thus it is also subjected to exhaustion condition.

The present invention thus relates to the type of a torque transmitting shaft, represented by a cardan shaft, that includes two "real" subsections and by which these subsections are interconnected or disconnected to one other via said first mentioned safety coupling arrangement.

BACKGROUND OF THE INVENTION

Methods, arrangements and constructions related to the aforesaid technical field and having a function and a nature that fulfils these requirements are known to the art in a number of different forms.

A torque transmitting shaft, in the form of a cardan shaft, has, at least one end of said shaft, a first yoke, with two spaced arms, adapted to expose corresponding eyes for cooperation with a cross-shaped piece, adapted for a firm coordination, via a bolt joint, to an intermediate member for transmitting a torque.

Said shaft also having a safety coupling arrangement, adapted to be engaged to a first setting or position and to be disengaged to a second setting or position.

It is also previously known a cardan shaft, that includes an adapted "intermediate" member, which has a first end section, with a first universal joint yoke, and including, opposite to said first end section, a second end section, which may be formed with a second universal joint yoke, wherein said intermediate member may be formed as two separated members or related subsections, which are mutually connected or disconnected via a safety coupling arrangement.

This safety coupling arrangement is here intended to allow an engaged or positive rotation and torque transmission between these subsections in a "first positional setting" or connected setting, a first position, and having for this purpose an expanded positional setting.

In a "second positional setting" or disconnected setting, a second position, the safety coupling arrangement allows a free rotation between the subsections, under no torque transmission, wherewith the second position may automatically occur immediately after the torque, transmitted between the subsections, exceeds a pre-determined value, which is dependent on the mechanical construction of the safety coupling arrangement.

Cardan shafts, that include such safety coupling arrangements, are known to the art, although it has been found that in the case of confined and restricted spaces, such safety coupling arrangement takes-up too much space, partly, in the case of certain applications, in an axial sense or dimension and/or partly, in the case of certain applications, in a radial sense or dimension.

With regard to the evaluations and/or properties, associated with the present invention, it can be mentioned that different types of safety coupling arrangements are known to the art and adapted for their technical fields, such as different from cardan shaft applications.

One such earlier known safety coupling arrangement has been found particularly beneficial for the use in an application, associated with the present invention, and such a safety coupling arrangement is illustrated and described more specifically and in detail in a Swedish patent publication SE-525 837-C2, corresponding to an International Patent Application Serial Number PCT/SE2004/001935 (International Publication Number WO 2005/061 916-A).

The contents of this patent publication or International Patent Application is to be seen as a clarification of the safety coupling arrangement, used by the present invention and its new application.

The prior art also includes the technique shown and described in the following patent publications:

DE-195 29 890-A1 describes a cardan axis or shaft, arranged with an intermediate element or member for the purpose of transferring a torque.

Said intermediate element has been formed and constructed as a safety coupling arrangement, having an "expansion slot (11)".

More specifically it is shown an integrated safety coupling arrangement having a cylindrically formed "expansion slot (11)", which is coupled to a pressure inlet (12) and a valve (13).

If the inlet (12) is exposed to oil under pressure than a pressure force is activated between the shaft (10) and a sleeve (20), and said force is causing a frictional cooperation, offering a transfer of a torque.

Said safety coupling arrangement is here assigned to an intermediate element or member in said cardan shaft, the end-sections of which are in cooperation with a first and a second universal joint yoke, each in cooperation with additional universal joint yokes via a universal joint pin.

The present invention may be used as its application in a cardan shaft of the above mentioned construction.

Each universal joint yoke is here in cooperation with an intermediate member, via its bolt joint (2.1), causing a firm torque transmitting cooperation between each universal joint yoke (1, 2) and its intermediate member (3).

The patent publication DE-35 45 651-A1 is describing a safety coupling arrangement, related to the intermediate member.

The patent publication DE-86 12 620-U1 is describing a yoke arrangement for a cardan shaft, where this yoke is formed and designed to expose a coupling arrangement in the form of a disc coupling arrangement, formed adjacent to said yoke and having the discs oriented in a radial extension, in relation to the rotational axis.

The publication FR-2 849 479-A is illustrating another construction of a safety coupling arrangement related to the intermediate member.

SUMMARY OF THE PRESENT INVENTION

Technical Problems

When considering the technical deliberations required of a skilled person, within this technical field, in order to obtain a solution to one or more technical problems, it is necessary initially for said person to be aware of the measures and/or the sequence of measures that shall be taken to this end, also the necessary selection of the means that is or are required in this regard, it will be apparent that the following technical problems are relevant in achieving the object and the objects of the present invention.

When considering the earlier standpoint of techniques, as described above, it will be seen that a technical problem resides in realizing the significance of, the advantages associated with and/or the technical measures and deliberations that will be required in order to provide a torque transmitting shaft, such as a cardan shaft, where at least one end of said shaft having a first yoke, with its two spaced arms, adapted to expose corresponding eyes for a cooperation with a cross-shaped piece, adapted for a firm coordination, via a bolt joint, with an intermediate member for a transmitting of a torque, where an end section or extension of said shaft is formed to expose an axially arranged groove, adapted to enclose a first part of a safety coupling arrangement and yet is constructed for an adapted high torque transfer.

A technical problem also resides in realizing the significance of, the advantages associated with and/or the technical measures and deliberations that will be required in order to provide a torque transmitting shaft allowing the torque transmitting shaft to have a first yoke and a first end extension of said shaft to be integrally formed in one single unit.

A technical problem also resides in realizing the significance of, the advantages associated with and/or the technical measures and deliberations that will be required in order to provide a torque transmitting shaft allowing said end extension to be formed with a hollow-cylindrical and axially extending groove, and with said groove formed opened towards a circular and radially extending end surface of said first end extension.

A technical problem also resides in realizing the significance of, the advantages associated with and/or the technical measures and deliberations that will be required in order to provide a torque transmitting shaft allowing said groove to be formed to hold and to enclose an expandable hollow-cylindrical first part of said safety coupling arrangement, said first part being actuatable towards a first setting, and firmly formed to a second part in the form of a cylindrical disc, facing towards a radially extending end surface.

A technical problem also resides in realizing the significance of, the advantages associated with and/or the technical measures and deliberations that will be required in order to provide a torque transmitting shaft allowing said cylindrical disc to have peripherally distributed means for a bolt connection, such as a bolt-joint, co-operable with corresponding means for said bolt connection, such as a bolt-joint, related to said intermediate member.

A technical problem also resides in realizing the significance of, the advantages associated with and/or the technical measures and deliberations that will be required in order to provide a torque transmitting shaft allowing said first end extension or section and its groove to have a closed end, oriented at a predetermined distance from an outer curved part within said yoke intermediately oriented between said two arms.

A technical problem also resides in realizing the significance of, the advantages associated with and/or the technical measures and deliberations that will be required in order to provide a torque transmitting shaft allowing said distance to be adapted to fall within a ratio of 0.2 to 0.5, related to a chosen inner diameter of said groove within said first end extension or section.

A technical problem also resides in realizing the significance of, the advantages associated with and/or the technical measures and deliberations that will be required in order to provide a torque transmitting shaft allowing a predetermined material thickness, between an outer cylindrical surface of said groove and an outer cylindrical surface of said first end extension, to be chosen within the ratio of 0.1 to 0.3 of the radius of said first end extension.

A technical problem also resides in realizing the significance of, the advantages associated with and/or the technical measures and deliberations that will be required in order to provide a torque transmitting shaft allowing, an axial extension within said first section of said groove to be adapted to correspond to the radius chosen for said groove and said first end extension.

A technical problem also resides in realizing the significance of, the advantages associated with and/or the technical measures and deliberations that will be required in order to provide a torque transmitting shaft allowing said thickness to have a thicker section, adjacent said radially extending end surface, than adjacent and/or along a closed end within the groove.

A technical problem also resides in realizing the significance of, the advantages associated with and/or the technical measures and deliberations that will be required in order to provide a torque transmitting shaft allowing the axial extension of a thicker section to be adapted to extend, from said end surface axially along said groove, a distance of 40-80% of the total axial extension of said groove.

When considering the earlier standpoint of techniques, as described above, it will be seen as a technical problem in realizing the significance of, the advantages associated with and/or the technical measures and deliberations that will be required in order to provide a torque transmitting cardan shaft allowing an adapted "intermediate" member, where a first end section or extension of said member is designed for a non-rotatable or fixed co-action with a first universal joint yoke, and usually which, in a second end section or extension, opposite said first end section, is designed for a non-rotatable or fixed co-action with a second universal joint yoke, wherewith said intermediate member may be configured as and including two subsections, with one mutually joined by, and/or mutually coordinated via, a safety coupling arrangement, intended for transmitting torque between the two sections in a first positional setting of said safety coupling arrangement, which can quickly be switched to a second positional setting so as to allow these sections to be coupled freely from one another, and in this position immediately disconnect any torque transferred between said sections, as fast as the torque exceeds a predetermined value, dependent on the construction of the safety coupling arrangement, so that said safety coupling arrangement can be formed and constructed to adapt to said torque transmitting shaft in such a way that the safety coupling arrangement may have the same, or essentially the same, outer dimensions as a shaft and/or an intermediate member, that lacks such a safety coupling arrangement.

A technical problem also resides in the ability to realize the significance of, the advantages associated with and/or the technical measures and deliberations that will be required in allowing a torque transmitting cardan shaft to have the same maximum shaft diameter and the same length, as a shaft that lacks said safety coupling arrangement, by shortening an "intermediate" member and adding a first end section.

A technical problem also resides in the significance of and the benefits afforded by and/or the technical measures and deliberations that will be required in allowing the construction where a first end section of said intermediate member and its first universal joint yoke are integrally formed in one single unit.

A technical problem also resides in the significance of and the benefits afforded by and/or the technical measures and deliberations that will be required in allowing the construction where a previously known cardan shaft, may have a first universal joint yoke integrated with a safety coupling arrangement, as shown and described in publication WO-2005/061 916-A and to have a bolt joint, related to said safety coupling arrangement, to be firmly attached to an end section or surface of a shortened intermediate member.

A technical problem also resides in the significance of and the benefits afforded by and/or the technical measures and deliberations that will be required in allowing the construction of the first universal joint yoke and its first end section or extension to include a cylindrical groove for a part of said safety coupling arrangement and yet have said first universal joint and said first extension to withstand required torque transfer and its distribution form the legs through the first end section and via the safety coupling arrangement to the intermediate member and yet remaining the same or essentially the same outer, diametrical and/or lengthwise, dimensions.

A technical problem also resides in the significance of and the benefits afforded by and/or the technical measures and deliberations that will be required in allowing said first universal joint yoke and its first section of the intermediate member to enclose a major torque transmitting cylindrical part of said safety coupling arrangement.

A technical problem also resides in the significance of and the benefits afforded by and/or the technical measures and deliberations that will be required in order to provide a shaft that has an inbuilt safety coupling arrangement, so that it is able to transfer large torques via a special construction of and the orientation of the safety coupling arrangement and the distribution of the torque transfer afforded axially along said safety coupling arrangement and said cylindrical groove and by the presence of a shaft related intermediate part, which faces away from the safety coupling arrangement and which shaft related first part is dimensioned, via a bolt joint, to counteract and withstand the presence of shearing forces, caused by a torque exceeding the accepted transferred torque via said safety coupling arrangement.

A technical problem also resides in realizing the significance of, the benefits afforded by and/or the technical measures and deliberations that will be required in providing cooperation between a groove or cavity adjacent said first universal joint yoke and its first end section of its intermediate member, and its part of the safety coupling arrangement.

A technical problem also resides in realizing the significance of, the benefits afforded by and/or the technical measures and deliberations that will be required in providing, within said first universal joint yoke and its integrated and nearby oriented first end extension an axially oriented cylindrical groove or cavity, which has been allotted a centre axis that is oriented along an allotted rotational axis, assigned to said first universal joint yoke and its co-ordinated, intermediate member.

Another technical problem resides in the significance of, the benefits associated with and/or the technical measures and deliberations that will be required in allowing said circular groove or cavity to be dimensioned so as to allow a large axial part of the safety coupling arrangement, in the form of an expandable safety unit part, to be enclosed therein, wherewith a so called "shaft related part" of the safety coupling arrangement and its safety unit part, is dimensioned to counteract and withstand the shear forces developed by and/or caused by the transferred torque, said "shaft related part" shall be dimensioned and caused to extend slightly outside and pass an opening of said cylindrical groove or cavity.

A technical problem also resides in the significance of, the benefits associated with and/or the technical measures and deliberations that will be required in allowing the intermediate member, dimensioned for a required transmission of the torque and withstand the shear forces developed thereby, and its first section to be formed with a circular disc with a small axial extension related to said safety coupling arrangement, whose centre axis permits a connection via a bolt joint to a rotational shaft and/or its intermediate member.

Another technical problem resides in realizing the significance of, the benefit associated with and/or the technical measures and deliberations that will be required in order to allow said circular disc to stand in a rotationally rigid and fixed co-action with said intermediate member, in the form of a hollow- or sleeve-formed cardan shaft.

Another technical problem resides in realizing the significance of, the advantages afforded by and/or the technical measures and deliberations that will be required in allowing a central region of an outer cylindrically formed surface of the groove or cavity to be radially spaced from a centre axle of said first universal joint yoke, adjacent its additional universal joint yoke, in relation to the radius of said first universal joint yoke, corresponding to a ratio of between 0.95 and 0.65, preferably about 0.9 to 0.8.

Another technical problem resides in realizing the significance of, the advantages afforded by and/or the technical measures and deliberations that will be required in allowing the central region of an inner cylindrically formed surface of the groove or cavity in said universal joint yoke to be radially spaced from a centre axle of the first universal joint yoke, in relation to the radius of said first universal joint yoke, corresponding to a ratio of between 0.80 and 0.50, preferably about 0.7 to 0.6.

A technical problem also resides in realizing the significance of, the benefits afforded by and/or the technical measures and deliberations that will be required in allowing a filling or evacuating nipple, related to the safety coupling arrangement, capable of causing a hollow cylindrical part of the safety coupling arrangement to move or expand via a so called "safety unit part", from its first positional setting or position to its second positional setting or position or vice versa and adapted to be carried by said first universal joint yoke at a portion or opening facing away from said universal joint yoke towards said intermediate member.

Another technical problem resides in the ability to realize the significance of, the benefits afforded by and/or the technical measures and deliberations that will be required in allowing an axial extension of the groove or cavity to be adapted so as to correspond to, or at least essentially correspond to, a radius of the universal joint yoke.

A technical problem also resides in the ability to realize the significance of, the benefits afforded by and/or the technical measures and deliberations that will be required in allowing the axial extension, from a fictive intersecting line, between said first section and the universal joint yoke, in relation to the radius, to fall within the ratio of 0.3 to 0.7, such as 0.4 to 0.6, especially about 0.5.

A technical problem also resides in the ability to realize the significance of, the benefits afforded by and/or the technical measures and deliberations that will be required in allowing a first axial extension, from a fictive intersecting line, towards and preferably partly over said groove or cavity, having a continuously reducing radius of an outer cylindrical surface, in relation to the radius of said first universal joint yoke or subsection, having a ratio of 0.4 and 0.9, such as 0.5 to 0.6.

A technical problem also resides in the ability to realize the significance of, the benefits afforded by and/or the technical measures and deliberations that will be required in allowing a second axial extension, from said first extension and said fictive intersecting line towards and over said groove or cavity, having a continuous radius of an outer cylindrical surface, in relation to the radius of said first universal joint yoke, having a ratio of 0.5 and 0.2, such as 0.25 to 0.35.

A technical problem also resides in the ability to realize the significance of, the benefits afforded by and/or the technical measures and deliberations that will be required in allowing a third axial extension, from said first and second extensions and said fictive intersecting line and over said groove or cavity, having a continuous and/or larger radius of an related outer cylindrical surface, in relation to the radius of said first universal joint yoke, having a ratio of 0.1 to 0.3, such as 0.15 to 0.25.

A technical problem also resides in the ability to realize the significance of, the benefits afforded by and/or the technical measures and deliberations that will be required in allowing a fourth axial extension, from said first, second and third extensions and said fictive intersecting line over and terminating said groove or cavity, having a continuous and/or discontinuous still larger radius of an outer cylindrical surface, in relation to the radius of said first universal joint yoke, having a ratio of 0.02 to 0.2, such as 0.04 to 0.1.

Another technical problem resides in realizing the significance of, the benefits afforded by and/or the technical measures and deliberations that will be required in allowing an axially oriented and radially narrow safety coupling arrangement to be adapted to enable said safety unit part included therein to take said first positional setting or position and thereby latch or block any rotational movement between the sections for transferring torque, while enabling said safety unit part to take a second positional setting or position and thereby free the sections for a free rotational movement there between, and thereby causing a complete absence of any torque transmission.

Another technical problem resides in realizing the significance of, the benefits afforded by and/or the technical measures and deliberations that will be required in order to allow said safety coupling arrangement to include said axially oriented groove or cavity, in the form of an axially midway groove, where said groove or cavity shall be shaped and adapted to enclose said safety unit part, which is able to expand in response to an added overpressure into a cavity or sealed space within said safety unit part.

Another technical problem resides in realizing the significance of, the benefits afforded by and/or the technical measures and deliberations that will be required in allowing said expandable safety unit part to be adapted to act against the whole of, or essentially the whole of, the axially oriented groove or cavity in said first end section or universal joint yoke and its inner and outer surfaces and to adapt and treat the surfaces of superficial parts of the groove and/or an outer surfaces of the safety unit part, so that said surfaces are able to co-act with pronounced pressure towards each other and thereby causing a frictional effect with opposing surface parts of an expanded safety unit part.

Solution

The invention takes as its starting point the aforesaid known technology relating to a torque transmitting shaft, where at least one end section or extension of said shaft having a first yoke, with its two spaced arms, adapted to expose corresponding eyes for a cooperation with a cross-shaped piece, adapted for a firm coordination, via a bolt joint, with an intermediate member for a transmitting of a torque, said shaft also has a safety coupling arrangement, adapted to be engaged in a first setting or position and to be disengage in a second setting or position In order to solve one or more of the technical problems listed above, it is proposed, in accordance with the present invention, that the known technology is supplemented by providing said first yoke and a first end section or extension of said shaft to be integrated formed to one single unit, whereby said end extension is formed with a hollow-cylindrical and axially extending groove.

Said groove is formed open towards a circular and radially extending end surface of said first end section or extension.

Said groove is formed to hold and to enclose an, expandable hollow-cylindrical first part of said safety coupling arrangement.

Said first part being firmly or integrally formed with a second part, in the form of a cylindrical disc, facing towards said end surface and that said cylindrical disc has peripherally distributed means for a bolt connection, such as a bolt-joint, co-operable with corresponding means for said bolt connection, such as a bolt-joint, related to said intermediate member.

By way of suggested embodiments, that lie within the scope of the present inventive concept it is proposed that said first end section and its groove has a closed end, at a predetermined distance from an outer curved part, intermediate oriented between said arms.

Said distance is adapted to fall within a ratio of 0.2 to 0.5 of a chosen inner diameter of said groove.

Further it is suggested that a material thickness, between an outer cylindrical surface of said groove and an outer cylindrical surface of said first end section or extension is falling within the ration of 0.1 to 0.3 of the radius of said first section.

An axial extension of said groove is adapted to correspond to, or essentially correspond to, a radius of said groove and its inner radius.

It is especially suggested that said thickness has a thicker section adjacent said radially extending end surface than adjacent said closed end surface and that the axial extension of said thicker section is adapted to extend, from said end surface, axially along said groove a distance of 40-80% of said groove.

The present invention is also directed to a torque transmitting shaft in the form of a cardan shaft, which includes an adapted intermediate member, of which an end section or extension is configured for a rotationally rigid co-action with a first universal joint yoke, and preferably, which in an opposition end section, is configured for rotationally rigid co-action with a second universal joint yoke, wherein said intermediate member may be constructed as and comprises of at least two subsections, which are mutually related to each other for a torque transmitting, a safety coupling arrangement and its safety unit first part is further intended to ensure that said sections may be engaged with one another in a first setting and free to rotate relative to each other in a second setting, wherein said second setting may be activateable immediately after a torque, between said sections, exceeds a predetermined value, determined by the construction of said safety coupling arrangement and its part.

It is here suggested that adjacent said first universal joint yoke is an axially orientated cylindrical groove or cavity formed, said groove is axially extending towards said intermediate member, with a centre axis of said groove co-ordinated with or in alignment with a rotational axis assigned to said end section and its co-ordinated universal joint yoke; and in that said cylindrical groove is dimensioned so as to be able to enclose an axially extending major part of said safety coupling arrangement, in the form of its safety unit part and that said safety coupling arrangement has a bolt joint for a cooperation with an end surface of said intermediate member.

A shaft related second part of said safety coupling arrangement, dimensioned to take up developed or caused shear forces from the torque transmission, is formed integrally as a circular element, disc or bolt joint, whose centre axis is to be in alignment with the rotational axis.

Said circular element or disc is in a fixed co-action with an end surface of said intermediate member.

It is further suggested that a central region of an outer cylindrically formed surface of said groove or cavity is to be radially spaced from a centre axis of the first end extension, adjacent its universal joint yoke, in relation to the radius of said first end extension, that corresponds to a ratio of between 0.95 and 0.65, preferably about 0.9 to 0.8.

It is further suggested that the central region of an inner cylindrically formed surface of the groove or cavity is to be radially spaced from a centre axle of the first universal joint yoke or section, in relation to the radius of said first universal joint yoke, where the distance is corresponding to a ratio of between 0.80 and 0.50, preferably about 0.7 to 0.6.

With regard to said central region of the outer cylindrical surface of the groove or the recess said region will conveniently be positioned at a distance from the outer cylindrical surface of its first universal joint yoke, adjacent its universal joint yoke with respect to its radius, that is corresponding to a ratio of between 0.8 and 1.2, preferably about 1.0.

The present invention is further allowing an axial extension of the groove or cavity to be adapted so as to correspond to, or at least essentially corresponds to, the radius of said first universal joint yoke.

It is further suggested that a firstly mentioned axial extension from a fictive intersecting line, between said first end section and its universal joint yoke, in relation to the radius of the first universal joint yoke and a terminating end of said groove, is to fall within the ratio of 0.3 to 0.7, such as 0.4 to 0.6, especially about 0.5.

A firstly mentioned axial extension, from said fictive intersecting line in a direction towards said groove or cavity, has a continuously reducing radius, of an outer cylindrical surface in relation to a radius of said first universal joint yoke, and has a ratio of 0.4 to 0.9, such as 0.5 to 0.6.

A secondly mentioned axial extension, from said first extension and said fictive intersecting line, towards and over said groove or cavity, has a more continuous radius of an outer cylindrical surface in relation to the radius of said first universal joint yoke, and has a ratio of 0.5 to 0.2, such as 0.25 to 0.35.

A thirdly mentioning axial extension, from said first and second extensions and said fictive intersecting line over said groove or cavity, having a continuous however larger radius of an outer cylindrical surface in relation to the radius of said first universal joint yoke, and has a ratio of 0.1 to 0.3, such as 0.15 to 0.25.

A fourthly mentioned axial extension, from said first, second and third extensions and said fictive intersecting line over and terminating adjacent said groove or cavity, and having a continuous or discontinuous still larger radius of an outer cylindrical surface, in relation to the radius of said first universal joint yoke, and has a ratio of 0.02 to 0.2, such as 0.04 to 0.1.

A central region of an outer cylindrically formed surface of the groove or cavity is to be radially spaced from the centre axle of a first end part, adjacent its universal joint yoke, in relation to the radius of said first end extension, corresponds to a ratio of between 0.95 and 0.65, preferably about 0.9 to 0.8.

It is also recommended that a filling (or evacuating) nipple, for bringing the safety coupling arrangement and its safety unit first part to its first positional setting shall be related to and configured so that it can be carried by said first end section or extension, however within a region extending away from said universal joint yoke and extending towards and partially through said shaft related first end section, dimensioned to take up any shear forces.

The intermediate member may conveniently be adapted to have two torque transferring subsections, said subsections can be displaced axially in relation to one another by means of devices, adapted to this end, such as splines.

One of these subsections, a first subsection, can then be divided into two, of which one section is allotted to the first universal joint yoke and the second section is allotted to the remaining part of said first section.

The safety coupling arrangement used shall then be adapted so that it can, via its safety unit first part, take a first setting position, and therewith latch any relative rotational movement between said first end section and said intermediate member, so that the transfer of torque can take place, while enabling said safety unit first part to take a second setting position and therewith enable the sections and the members not to be subjected to any torque transmission, and to rotate freely.

The expandable safety unit first part will conveniently be adapted to act against all or the whole, or substantially all or the whole, of the axially extending groove or cavity and that the groove-associated surface parts are adapted to co-act with opposing surfaces of the expandable safety unit first part, with a pronounced and sufficient pressure force and a frictional effect.

Said two subsections of the shaft are comprised of an inner shaft related part and an outer sleeve related part and in that splines, together with their respective grooves, are arranged in said sleeve related part.

The safety coupling arrangement includes an axially orientated cavity, in the form of a compartment, within said first end section with its associated universal yoke (21) and in that said compartment is configured and adapted for enclosing an overpressure in said first part that is expandable in said cavity.

Advantages

Those advantages that are primarily characteristic of the present invention and the significant special features of the invention reside in the provision of conditions in respect of a simply "intermediate" member of a torque transmitting shaft, in the form of a cardan shaft. Said cardan shaft is preferably formed for a non-rotatably, fixed and rigid co-action with a first and a second universal joint yoke, in a first and second end section thereof.

Said first universal joint yoke and an intermediate member shall be mutually joined to and related to each other via a safety coupling arrangement and its safety unit parts, which are intended to positively allow the transfer of torque, in a first positional setting or position, and in a second positional setting or position forming a free rotation.

The arrangement gives advise of a compact construction of a first universal joint yoke and a first end section or extension of said intermediate member, said first end section is formed to embrace a first part of said safety coupling arrangement and thereby create conditions, in which the yoke and the end section are mutually accomplishing the required torque transfer.

Immediately after the torque, between said yoke and its end section and the intermediate member, exceeds a value, governed by the construction of the safety coupling arrangement, the safety coupling arrangement is released.

BRIEF DESCRIPTION OF THE DRAWINGS

An earlier known application of a cardan shaft and an earlier proposed "fictive" safety coupling arrangement and a proposed embodiment of a torque transmitting shaft, in the form of an improved cardan shaft, at present preferred, with its associated "intermediate" member and a "real" safety coupling arrangement related thereto, having or exposing the characteristic features significant with regard to the present invention, will now be described in more detail by way of example with reference to the accompanying drawing, in which.

Figure 1:
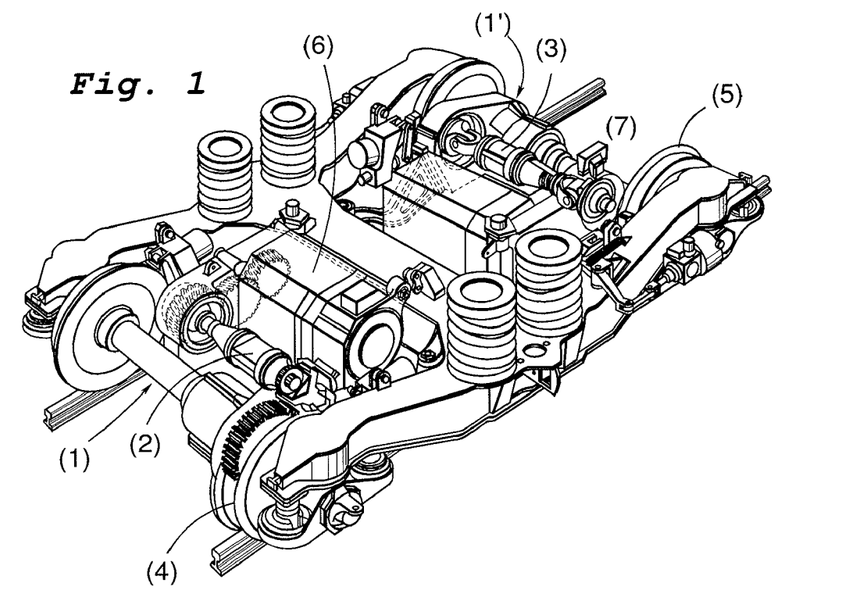
FIG. 1 is a perspective view of an embodiment of a bogey or bogie unit, intended for a track-bounded vehicle or a rail-adapted vehicle and comprising or using two cardan shafts for driving two wheel pairs in the bogie unit, by transferring a torque from a motor unit to said wheel pairs, wherein an "intermediate" member, assigned to the cardan shaft, is adapted to include a "fictive" safety coupling arrangement.
Figure 2A:
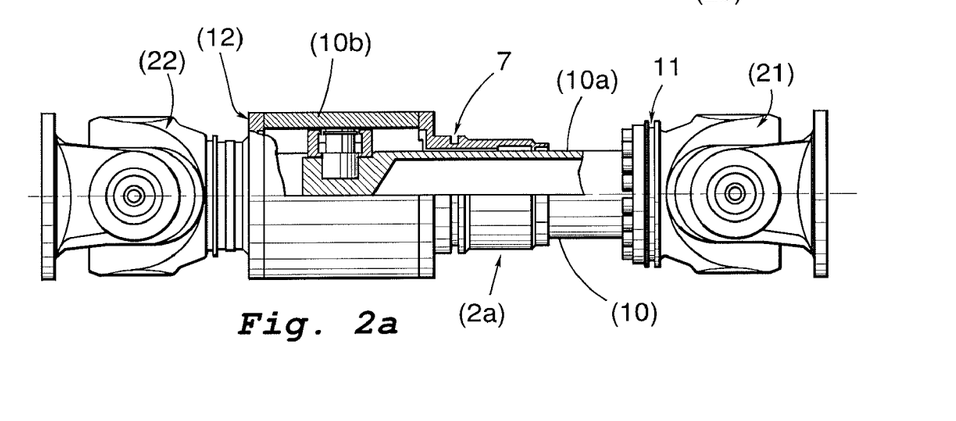
FIGS. 2a-c illustrate in sectioned views the design of each of the two part subsections of the cardan shaft, showing the position of said "fictive" safety coupling arrangement.
Figure 2B:
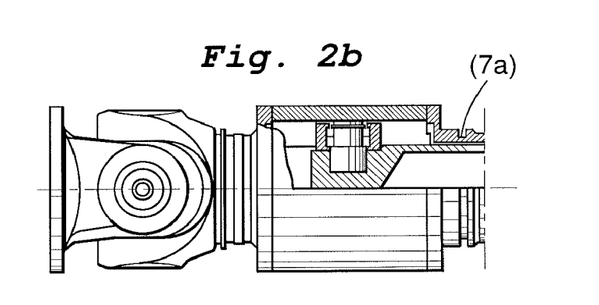
Figure 2C:
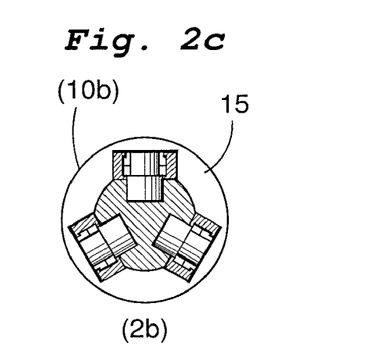

DESCRIPTION OF KNOWN TECHNOLOGY ACCORDING TO FIGS. 1 AND 2

Thus, FIG. 1 illustrates in a perspective view the construction of a track-bounded or rail bounded vehicle, which includes a bogey or bogie unit (1), (1'), which comprises two cardan shafts (2), (3) for driving each of two wheel pairs (4), (5) in the bogie unit (1), (1') by torque transmissions from a motor unit (6) to said wheel pair (4), wherein an intermediate member, associated with the cardan shaft (2), is adapted to include a safety coupling arrangement, of a previously known construction.

The safety coupling arrangement (7) is here demonstrated to be formed as a diameter-reducing groove (7a) or may alternatively having some other construction.

FIGS. 2a-b and 2c illustrate, in a side view and a cross-sectional view, respectively, an embodiment showing two sections of the cardan shaft (2).

As will be seen more specifically from FIGS. 1 and 2a-c, the cardan shaft (2) includes an adapted intermediate member (10), of which a first end section (11) is defined for rotationally rigid co-action with a first universal joint yoke (21) and a second end section (12), opposite to the first end section (11), is configured or defined for a rotationally rigid co-action with a second universal joint yoke (22), wherewith said intermediate member (10) is formed as and comprises of two fictive parts or subsections (10a), (10b), each related to said first end section (11) and said second end section (12).

Said two part sections (10a), (10b) are joined together via an indicated safety coupling arrangement (7) and its reduced diameter (7a), which is intended to ensure a free-coupling sequence and a separation (breaking or shearing) of these subsections from one another immediately after there exists, between the two subsections, a torque that exceeds a predetermined value, determined by the construction of the used safety coupling arrangement and its reduced cross-section or diameter (7a).

A DESCRIPTION OF A PREFERRED EMBODIMENT

It is initially pointed out that it has been used in the following description of a preferred embodiment of the present invention, showing those characteristic features that are significant with respect to the present invention and which are made clear in the enclosed FIGS. 3a to 9 of the accompanying drawings, terms and special terminology with the intention primarily of illustrating more clearly the concept of the present invention.

It will be understood, however, in this context that the terms and expressions used shall not be considered delimiting the scope of the invention but shall be considered as terms that shall be interpreted as also including all technical equivalence that function in the same way, or essentially in the same way, such as to achieve the same, or essentially the same, object and/or technical effect.

In FIGS. 1 and 2 reference numerals have been entered in between "brackets" and some of these reference numerals have also been used in the following description over the proposed embodiment of the present invention, however with said "brackets" deleted, solely in an ambition for a more simplified understanding of the presently described embodiment of the present invention.

Referring now to the accompanying drawings and FIGS. 3a to 9 it will be seen that these figures not only illustrate the present invention diagrammatically but also concretizing the significant characteristic features of the present invention by means of the embodiment proposed hereinafter and described hereinafter in more detail.

Figure 3A:
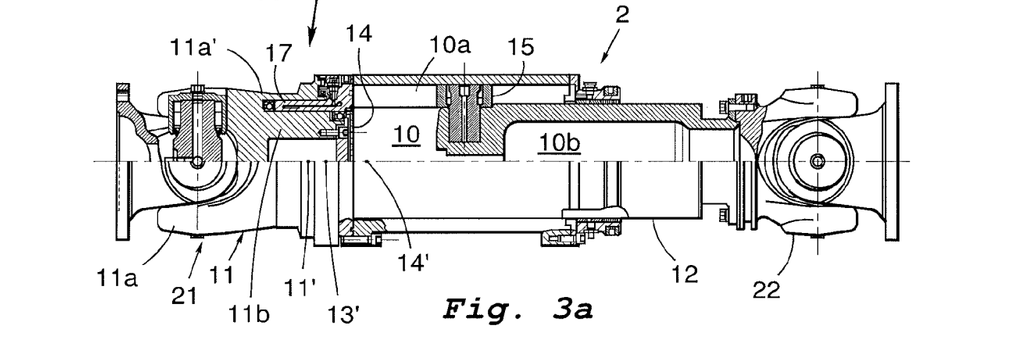
FIG. 3a is an axially sectioned view of a torque transmitting shaft, in the form of a cardan shaft, constructed in accordance with the significant features revealed by the present invention, concentrated towards a "real" safety coupling arrangement and its safety unit parts.

Thus there is shown in FIG. 3a a partly axial section of a cardan shaft 2, constructed in accordance with the special features of the present invention.

It is here to be noted that said cardan shaft 2 includes a first end section 11, having a first universal joint yoke 21 and a second end section 12, having a second universal joint yoke 22.

Said first and second end sections 11 and 12 with its first and second universal joint yokes 21 and 22 are related to said cardan shaft 2 via an intermediate member or shaft 10.

Even if the following description over a preferred embodiment is showing a safety coupling arrangement 7 as a unit, cooperating with said universal joint yoke 21, said arrangement 7 may be related to said second universal joint yoke 22 or to both end sections 11 and 12.

The present invention is based upon a torque transmitting shaft 2, where at least one end section 11 of said shaft having a first yoke 21, with its two spaced arms, adapted to expose corresponding eyes for a cooperation with a cross-shaped piece or pin, adapted for a firm coordination, with said intermediate member or shaft 10 for a transmission of a torque.

Said shaft 2 also has a safety coupling arrangement 7, adapted to be engaged to a first setting or position and to be disengage to a second setting or position.

Figure 4:
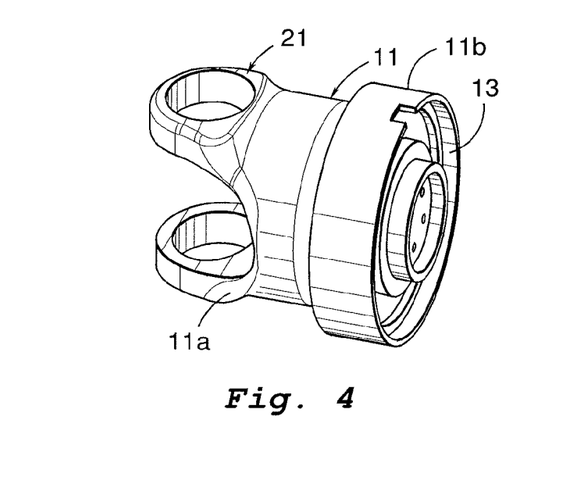
FIG. 4 is a perspective view of a first end section or extension, formed integrally with a first universal joint yoke, without an inserted safety coupling arrangement.

The present invention is especially suggesting that said first yoke 21 and a first end section or extension 11b of said shaft 2 are integrated formed to one single unit (FIG. 4).

Said extension 11b is formed with a hollow-cylindrical and axially extending groove 13, said groove 13 is formed open towards a circular and radially extending end surface of said end extension 11b, and said groove 13 is formed to hold and to enclose a, expandable hollow-cylindrical, first part 17' of said safety coupling arrangement 7.

Said first part 17' being firmly or integrally formed with a second part 17", in the form of a cylindrical disc, facing towards an end surface of and to the intermediate member 10.

Further said cylindrical disc 17" has peripherally distributed means, for a bolt connection 14, such as a bolt-joint, co-operable with corresponding means for said bolt connection, such as a bolt-joint, related to an end surface of said intermediate member 10.

Further said second end section 11b and its groove 13 has a closed end 13e, at a predetermined distance from an outer curved part, intermediate oriented between said arms.

Said distance is adapted to fall within a ratio of 0.2 to 0.5 of a chosen inner diameter "R3" of said groove 13.

A material thickness between an outer cylindrical surface 13a of said groove 13 and an outer cylindrical surface 11a' of said first part 11a is falling within the ration of 0.1 to 0.3 of the radius "R1" of said first part 2a.

An axial extension "L2" of said groove 13 is adapted to correspond to, or essentially correspond to, a radius of said groove and its inner radius "R3".

Said thickness has a thicker section 11a''', adjacent said radially extending end surface, than an adjacent thick part 11a'' closer to the end 13e.

The axial extensions "L5", "L6" of said thicker sections are adapted to extend from said end surface 21' axially along said groove 13 a distance of 40-80% of said groove.

Figure 3B:
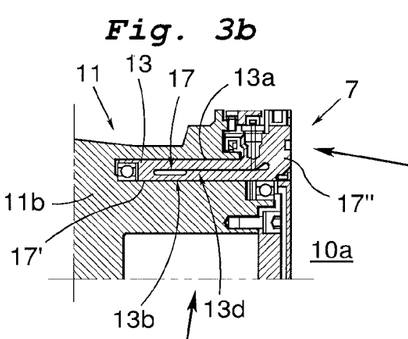
FIG. 3b is a somewhat enlarged first view of an area around one half of said "real" safety coupling arrangement.
Figure 3C:
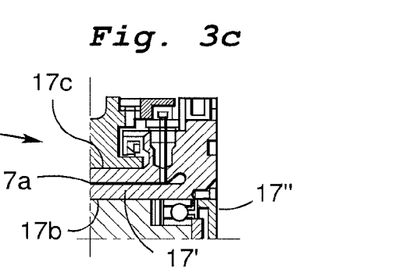
FIG. 3c is a further somewhat enlarged second view of an end section, facing towards the intermediate member, which is subjected to and dimensioned for high shear forces, originating from a torque transmission.

In a somewhat enlarged view FIG. 3b shows an area around one half of the safety coupling arrangement 7 and in a further enlarged view FIG. 3c illustrates the construction of a safety coupling arrangement related cylindrical part 17", which is dimensioned to deal with and withstand high shear forces, caused by the instant torque transmission.

Thus, FIGS. 3a-c illustrate a cardan shaft 2, which includes an adapted intermediate member or shaft 10, with a first end section 11.

Said intermediate member 10 is formed to co-act with said first universal joint yoke 21 and its first end extension, via a bolt joint, in a rotationally rigid manner and thus slipfree, and which member 10, in a second end section 12 thereof, opposite to said first end section 11, is also constructed, for a preferred rotationally rigid co-action with a second joint yoke 22.

It is here to be noted that said second part of safety coupling arrangement 7 is formed as a cylindrical disc 17", having holes or threads for said bolt joint for a rigid cooperation with an end section 14 or surface of said intermediate member 10. Integrated thereto is a hollow-cylindrical arrangement part 17', formed with said disc 17" as a single unit in FIG. 5.

Figure 5:
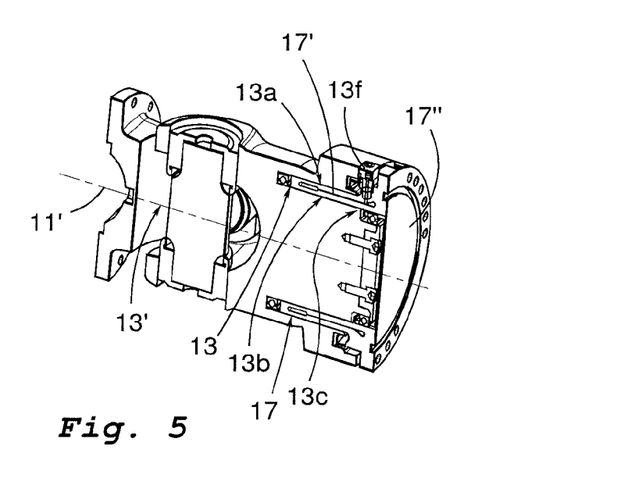
FIG. 5 is a perspective view and a sectioned view through a rotational centre for said first end section or extension with its first universal joint yoke, illustrated with a corresponding or additional universal joint yoke connected to a drive or a driven shaft via a disc-shaped element, for the transmission of torque through the first universal joint yoke, the first end section or extension of the cardan shaft via said safety coupling arrangement and its safety unit part, to the intermediate member, via a bolt joint.

Said first and second universal joint yokes 21 and 22 are to be connected to additional universal joint yokes by using a universal joint pin arrangement. One such additional joint yoke is illustrated in FIG. 5.

Said intermediate member 10 is here configured so as to including two parts or sections, one subsection 10a related to the first universal joint yoke 21 and one subsection 10b related to be attached to the second universal joint yoke 22.

The present invention will be described more in detail with the use of the sleeve formed subsection 10a, however a person skilled in this art may have a safety coupling arrangement 7, adapted to the shaft formed subsection 10b and its universal joint yoke 22.

FIG. 3b illustrates that the first end section 11 comprises two parts, here is one yoke related part, designated with reference numerals 11a, and related to the first universal joint yoke 21, and a second part 11b, in the form of a safety coupling arrangement 7.

Said part 11a is integrated with the universal joint yoke 21 and the second part 11b is related, via a bolt joint and a disc 14, to the subsection 10a of the intermediate member 10.

Said parts are mutually related to each other or in co-operation with each other via said safety coupling arrangement 7 and especially by its safety unit part 17', and the disc 17", for a mutual rotational movement or for a free rotational movement, depending upon the actual setting or position of said first part 17'.

This arrangement 7 is thus intended to enable said part 11a, 11b and said member 10a to be free from one another, in said second positional setting or second position, such as immediately after the torque between said parts 11b, 14, 10a, exceeds a predetermined value, dependent on the particular mechanical construction of the safety coupling arrangement 7, thus used.

The first end section 11 and its universal joint yoke 21, has within said part 11b said axially orientated cylindrically formed groove 13 or cavity, and which groove 13 has a centre axis 13' (FIG. 5), which is co-ordinated with and in alignment with a rotational axis 11', assigned to said first end section 11 and its integrated and co-ordinated universal joint yoke 21.

The hollow-cylindrical formed groove 13 is dimensioned to enclose a major cylindrical part 17' of said safety coupling arrangement 7, in the form of a safety unit first part 17', and integrated to said safety unit second part 17' is formed said disc 17".

Said second part 17" is dimensioned to deal with and withstand the shear forces developed by the transferred torque and is further adapted to extend slightly beyond said groove 13 and its opening 13c thereof to form said disc 17".

Part 17" dimensioned for dealing with developed shear forces, is formed for an attachment to or integration with a circular disc 14, whose centre axis connects with or is in alignment with the rotational axis 11' of the end section 11. A disc element 14 with holes may here be considered as an attached part to said member 10a.

The circular disc element 14 may be in a rotationally rigid and fixed co-action with the intermediate member 10 and its subsection 10a of said cardan shaft 2.

Figure 8:
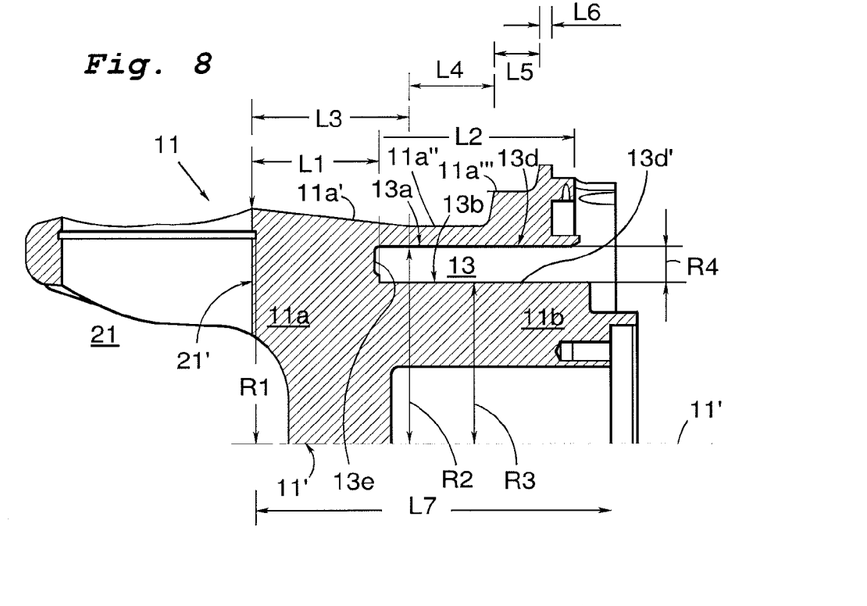
FIG. 8 is a sectioned view taken through the rotational axis of half of the first end section or extension with its first universal joint yoke, illustrating the integrated form between the first end section and its first universal joint yoke
Figure 9:
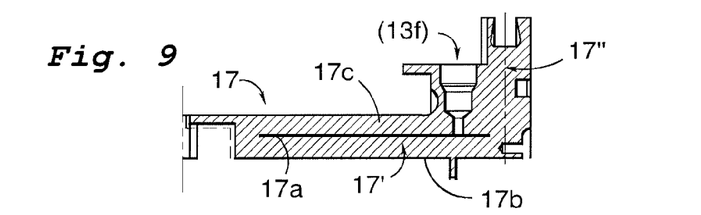
FIG. 9 is a sectional view of a hollow cylindrical safety unit first part of the safety coupling arrangement, which can be expanded, in response to an added oil overpressure through said filling nipple, however said hollow cylindrical part being shown in a non-expanded state, a position corresponding to the second positional setting or position when the oil pressure has been evacuated.

With reference to FIGS. 8 and 9, showing an upper part section of the end section 11 and its integrated universal joint yoke 21 only above the centre line 11', it is obvious that a lower section is identically formed and thus not shown.

Thus FIGS. 8 and 9 show a construction allowing the central region 13d of an outer cylindrically formed surface 13a of the groove or cavity 13 to be radially "R2" spaced from the centre axle 11' of the first end part 11 or section, adjacent its universal joint yoke 21, in relation to the radius "R1" of said first end part 11, to correspond to a ratio "R2/R1" of between 0.95 and 0.65, preferably about 0.9 to 0.8.

Further the central region 13d' of an inner cylindrically formed surface 13b of the groove or cavity 13 is to be radially "R3" spaced from the centre axle 11' of the first end part or section, adjacent its universal joint yoke 21, in relation to the radius "R1" of said first end part 11, to correspond to a ratio "R3/R1" of between 0.80 and 0.50, preferably about 0.7 to 0.6.

The difference between the radial distances "R2" and "R3" is denoted "R4" in FIG. 8.

An axial extension "L2" of the groove or cavity 13 is to be adapted so as to correspond to, or at least essentially corresponds to, the radius "R1" of the first end section 11.

An axial extension "L1" from a fictive intersecting line 21', between said first section 11a and its integrated universal joint yoke 21, in relation to the radius "R1", is to fall within the ratio of 0.3 to 0.7, such as 0.4 to 0.6, especially about 0.5.

A "firstly" mentioned axial extension "L3", from said fictive intersecting line 21' towards said groove or cavity 13, has a continuously reducing radius, of an outer cylindrical surface 11a' in relation to the radius "R1" of said first section 11, having a ratio of 0.4 to 0.9, such as 0.5 to 0.6.

A "secondly" mentioned axial extension "L4", from said first extension "L3" and said fictive intersecting line 21' towards and over said groove or cavity 13, having a continuous radius, of an outer cylindrical surface 11a" in relation to the radius "R1" of said first section 11, has a ratio of 0.5 to 0.2, such as 0.25 to 0.35.

A "thirdly", mentioned axial extension "L5", from said first and second extensions "L3". "L4" and said fictive intersecting line 21' over said groove or cavity 13, having a continuous larger radius, of an outer cylindrical surface 11a'" in relation to the radius "R1" of said first section 11, has a ratio of 0.1 to 0.3, such as 0.15 to 0.25.

A "fourthly" mentioned axial extension "L6", from said first, second and third extensions "L3". "L4", and "L5" and said fictive intersecting line 21' over and terminating said groove or cavity 13, having a continuous or discontinuous still larger radius, of an outer cylindrical surface, in relation to the radius "R1" of said first section 11, has a ratio of 0.02 to 0.2, such as 0.04 to 0.1.

Figure 6:
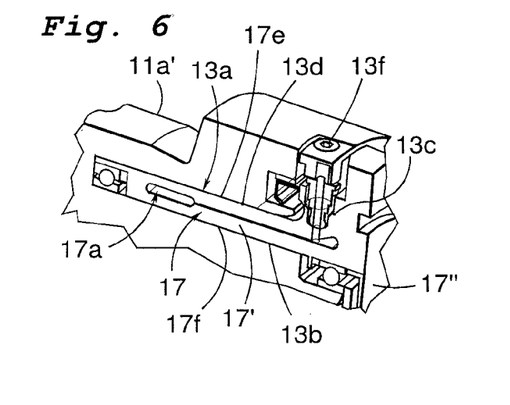
FIG. 6 illustrates in a larger scale than in FIG. 5 a shaft related end section or extension and its safety coupling arrangement and its safety unit part, with its associated filling (or evacuating) nipple, for bringing the safety coupling arrangement and its safety unit first part to its first positional setting or position and/or to its second positional setting or position.
Figure 7:
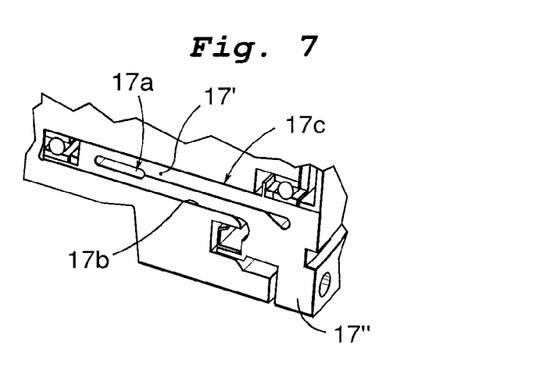
FIG. 7 illustrates said first end section and said safety coupling arrangement in a still larger scale.

A filling (or exhausting) nipple or nozzle 13f, related to said safety coupling arrangement 7, is adapted to be carried by a said safety unit part 17' and adjacent said disc related part 17", which faces away from said universal joint yoke 21, and which extends towards and partly through said part 17', dimensioned for taking up said shear forces.

The illustrated safety coupling arrangement 7 is here adapted to include said safety unit part 17, (17', 17"), illustrated with an internal cavity 17a or a sealable space.

Said part 17', in a first positional setting, is causing a function in which a rotation between said subsections or parts 11b, 10a for torque transmission is active, and the transmitted torque is acting axially through the subsections of the shaft, while said safety unit part 17' is able to take another, a second positional, setting and therewith enable a free rotary movement between said subsection 11b, 10a to take place, in the absence of any torque transmission towards and through said subsections.

The safety coupling arrangement 7 thus includes, in the safety unit part 17', an axially orientated cavity 17a, in the form of a cylindrically adapted channel, within said groove 13.

The cavity 17a is formed and adapted so as to be able to enclose or surround an oil overpressure, within its expandable parts 17c of the cavity 17a.

The expandable parts 17b, 17c are adapted to act against the whole or essentially the whole of the axially directed groove 13, and its cylindrical surface parts 13a, 13b of the groove 13, and are adapted to co-act frictionally with opposing surface parts 17e, 17f of the expandable parts 17'.

The two subsections consist in an inner axle related part 10b and an outer sleeve related part 10a and related splines, with their axial grooves disposed on the sleeve related part.

Mounted between said axle or shaft related part 10b and said sleeve related part 10a are docking elements 15, which each including shafts which are orientated radially to the axle related part 10b and which include shaft sections, that extend beyond said axle for co-action with a bearing arrangement, such as a ball bearing or roller bearing arrangement.

This bearing arrangement is intended to co-act with the axial grooves, defined by the splines.

The docking elements will be three in number and end-orientated with respect to its shaft-related part.

With a further reference to FIG. 8 and FIG. 9 it is clear that the end section 11 (11a, 11b) and its yoke 21 have the following radial and/or axial relation.

Surfaces 11a', 11a", and/or 11a''' have a radius in relation to "R1" of 1.0; 0.9 and 1.1.

The radius "R2" to the outer and radius "R3" to the inner surfaces of the groove 13 in relation to radius "R1" is here within the ratio of 0.7 to 0.9.

The cylindrical surface 11a' has a radius reducing section "L3" positioned adjacent and slightly passing said end surface 13e, and thereafter a section "L4" has a constant radius and further a section "L5", passing the central area 13d, has a larger radius and further a supporting rim "L6".

The sections "L3", "L4", "L5" and "L6" are formed for the reduction of material and to adapt the thickness to a calculated torque transfer. The reduction of material is also achieved by a central recess extending centrally within said end extension to said end 13e of said groove 13.

The axial length "L2" of the groove 13, compared to the total length "L7" of the section 11a, 11b is here chosen to 0.4 to 0.9, as 0.5 to 0.7, preferably 0.6.

Section "L7" indicates the total length of said end section 11a+11b and a section "L2" is a suggested length of the acting surface of the hollow-cylindrical first part 17'.

Surfaces exposed for a torque transmission may be pretreated or in another way formed to increase the frictional effect.

It will be understood that the invention is not restricted to the above exemplifying embodiment thereof and that this embodiment can be modified within the scope of the inventive concept, illustrated in the following claims.

It will be particularly noted that each illustrated unit and/or circuit can be combined with each other illustrated unit and/or circuit within the scope of enabling the desired technical function to be achieved.

The invention claimed is:

1. A torque transmitting shaft, where at least one end section of said shaft having a first yoke, with two spaced arms adapted to expose corresponding eyes for a cooperation with a cross-shaped piece, adapted for a firm coordination, via a bolt joint, with an intermediate member for a transmitting of a torque, said shaft also having a safety coupling arrangement, adapted to be engaged to a first setting or position and to be disengaged to a second setting or position, wherein said first yoke and a first end extension or section of said shaft are integrally formed to one single unit, said end extension is formed with a hollow-cylindrical and axially extending groove, said groove is formed open towards a circular and radially extending end surface of said first end extension, said groove is formed to hold and to enclose an expandable hollow-cylindrical, first part of said safety coupling arrangement, said first part being firmly or integrally formed with a second part, in the form of a cylindrical disc, facing towards said intermediate member and that said cylindrical disc has peripherally distributed means for a bolt connection, co-operable with corresponding means for said bolt connection related to said intermediate member.

2. A torque transmitting shaft according to claim 1, wherein, said first end section and its groove have a closed end, at a predetermined distance from an outer curved part, intermediately oriented between said arms.

3. A torque transmitting shaft according to claim 2, wherein, said distance is adapted to fall within a ratio of 0.2 to 0.5 of a chosen inner diameter of said groove.

4. A torque transmitting shaft according to claim 1, wherein, a material thickness between an outer cylindrical surface of said groove and an outer cylindrical surface of said first end extension is falling within a ratio of 0.1 to 0.3 of a radius of said first extension or part.

5. A torque transmitting shaft according to claim 4, wherein, said thickness has a thicker section adjacent said radially extending end surface than that adjacent a closed end.

6. A torque transmitting shaft according to claim 5, wherein, an axial extension of said thicker section is adapted to extend from said end surface axially along said groove a distance of 40-60% of a total length of said groove.

7. A torque transmitting shaft according to claim 1, wherein, an axial extension of said groove is adapted to correspond to, or essentially correspond to, a radius of said groove and its inner radius.

8. A torque transmitting shaft in a form of a cardan shaft, which includes an adapted intermediate member, of which an end section is configured for a rotationally rigid co-action with a first universal joint yoke, and preferably, which in an opposition end section, is configured for a rotationally rigid co-action with a second universal joint yoke, wherein said intermediate member is constructed as and comprises of at least two subsections, which are mutually related to each other for torque transmission, a safety coupling arrangement and a safety unit first part, is further intended to ensure that said subsections may be engaged with one another in a first setting and free to rotate relatively each other in a second setting, wherein said second setting may be activateable immediately after a torque between said subsections exceeds a predetermined value, determined by a construction of said safety coupling arrangement and its unit parts, wherein adjacent said first universal joint yoke is an axially orientated cylindrical groove or cavity formed in a first end extension of said groove, axially extending, towards said intermediate member, with a center axis of said groove co-ordinated with or in alignment with a rotational axis assigned to said end section and its co-ordinated universal joint yoke; and wherein said cylindrical groove is dimensioned so as to be able to enclose an axially extending major part of said safety coupling arrangement, in the form of its safety unit first part and that said safety coupling arrangement has a disc and a bolt joint for a cooperation with an end surface of said intermediate member.

9. A shaft according to claim 8, wherein a shaft related first part or extension, dimensioned to take up developed or caused shear forces from the torque transmission, is formed integrally with a circular element having means for a bolt joint, whose center axis is to be in alignment with said rotational axis.

10. A shaft according to claim 9, wherein said circular element is in a fixed co-action with the end surface of said intermediate member.

11. A shaft according to claim 8, wherein a central region of an outer cylindrically formed surface of said groove or cavity is to be radially spaced from a center axis of the first end part or extension, adjacent its universal joint yoke, in relation to a radius of said first end part, corresponds to a ratio of between 0.65 and 0.95.

12. A shaft according to claim 8, wherein a central region of an inner cylindrically formed surface of said groove or cavity is to be radially spaced from a center axis of the first universal joint yoke or first end part or extension, in relation to a radius of said first universal joint yoke, corresponds to a ratio of between 0.50 and 0.80.

13. A shaft according to claim 8, wherein an axial extension of the groove or cavity is to be adapted so as to correspond to, or at least essentially correspond to, a radius of said first universal joint yoke.

14. A shaft according to claim 8, wherein an axial extension from a fictive intersecting line, between a first end section and the first universal joint yoke and a terminating end of said groove, in relation to a radius, is to fall within a ratio of 0.3 to 0.7.

15. A shaft according to claim 14, wherein a firstly mentioned axial extension, from said fictive intersecting line towards said groove or cavity, has a reducing radius, such as a continuously reducing radius, of an outer cylindrical surface, in relation to a radius of said first universal joint yoke and has a ratio of 0.4 and 0.9.

16. A shaft according to claim 15, wherein a secondly mentioned axial extension, from said first extension and said fictive intersecting line towards and over said groove or cavity, has a continuous radius, of an outer cylindrical surface, in relation to the radius of said first universal joint yoke and has a ratio of 0.2 and 0.5.

17. A shaft according to claim 16, wherein a thirdly mentioned axial extension, from said first and second extensions and said fictive intersecting line over said groove or cavity, has a continuous, however larger, radius of an outer cylindrical surface, in relation to the radius of said first universal joint yoke and has a ratio of 0.1 to 0.3.

18. A shaft according to claim 17, wherein a fourthly mentioned axial extension, from said first, second and third extensions, and said fictive intersecting line extending over and terminating adjacently said groove or cavity, has a continuous or discontinuous larger radius, of an outer cylindrical surface, in relation to the radius of said first universal joint yoke, and has a ratio of 0.02 to 0.2.

19. A shaft according to claim 8, wherein said intermediate member is adapted to include two subsections, which are axially displaceable in relation to one another through a medium of a means.

20. A shaft according to claim 19, wherein one of its subsections, a first subsection, is divided into two parts, where one part is allotted said universal first yoke and a second part is allotted a remaining part of said first subsection, and wherein said safety coupling arrangement is adapted to take a first positional setting, via a safety unit part included in said safety coupling arrangement, and therewith latch a rotational movement between said sections for transferring torque, while allowing the safety unit part to take another positional setting and therewith release rotational movement between said sections, to cause an absence of any torque transmission.

21. A shaft according to claim 20, wherein the safety coupling arrangement includes an axially orientated cavity, in a form of a compartment, within said first end section and wherein said compartment is configured and adapted for enclosing an overpressure in said safety unit part that is expandable in said cavity.

22. A shaft according to claim 21, wherein said safety unit part is adapted to act against all or essentially all of the axially directed groove surfaces and wherein allotted groove-surface parts are adapted for a co-action with opposing surface parts of the safety unit part with a frictional action.

23. A shaft according to claim 19, wherein said two subsections of the shaft are comprised of an inner shaft related part and an outer sleeve related part and wherein splines, together with their respective grooves, are arranged in said sleeve related part.

24. A shaft according to claim 8, wherein surfaces exposed for torque transmission are pre-treated or the like to increase a frictional effect.

* * * * *